Sept. 13, 1966 P. C. GAYLORD ET AL 3,272,671
METHOD OF MAKING A COMPOSITE FIBER AND METAL
TUBULAR CONTAINER BODY
Filed Aug. 28, 1963 5 Sheets-Sheet 1

INVENTORS
PAUL C. GAYLORD
HERBERT L. CARPENTER Jr.
BY
Kane, Dalsimer and Kane
ATTORNEYS

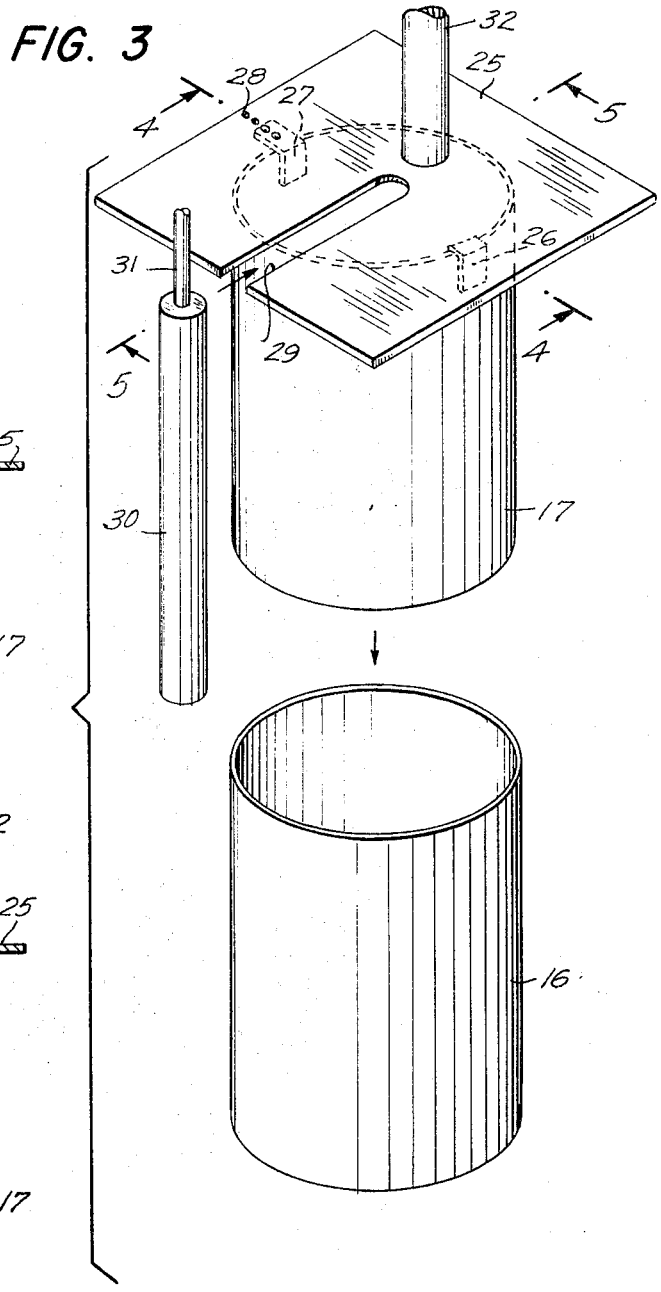

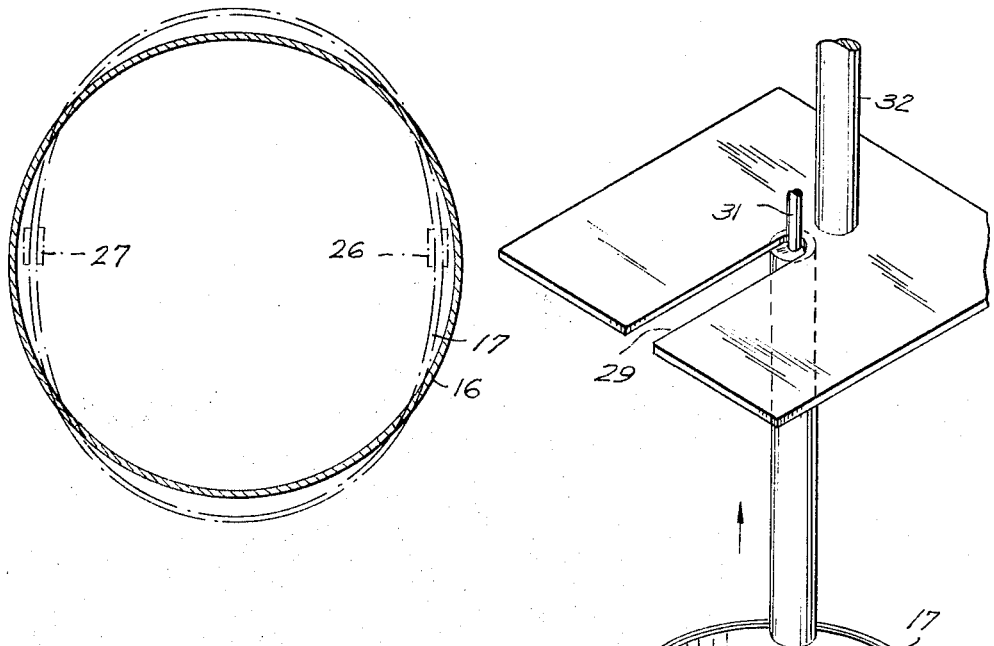
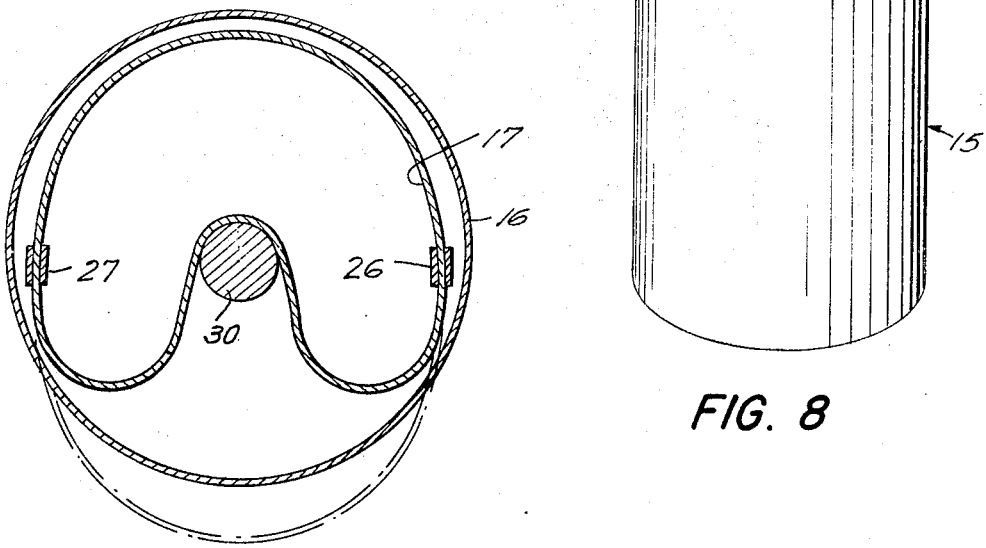

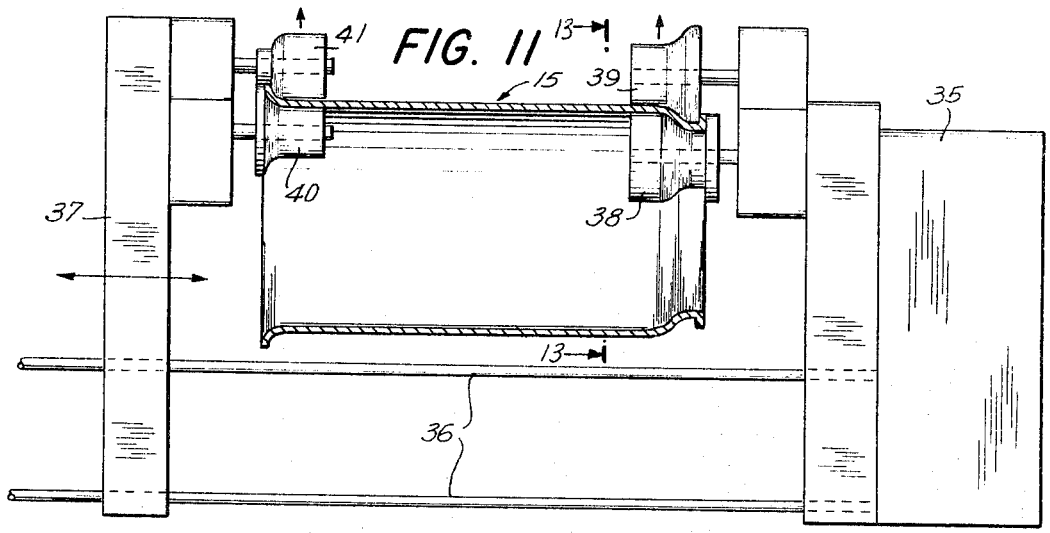
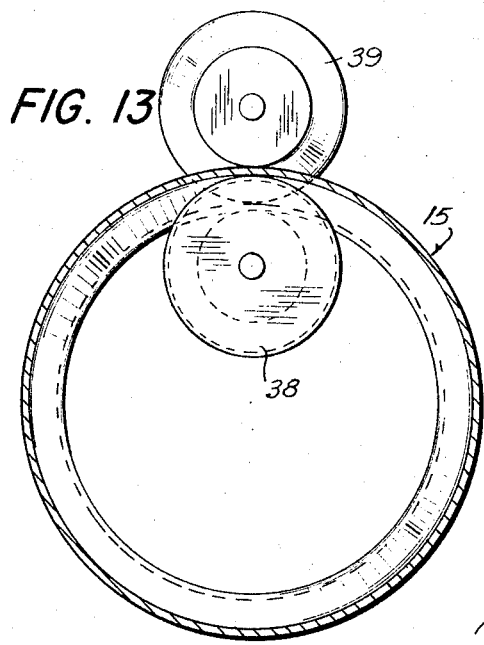
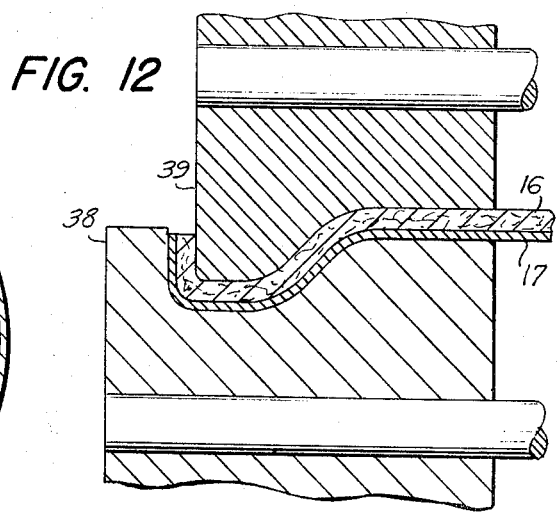
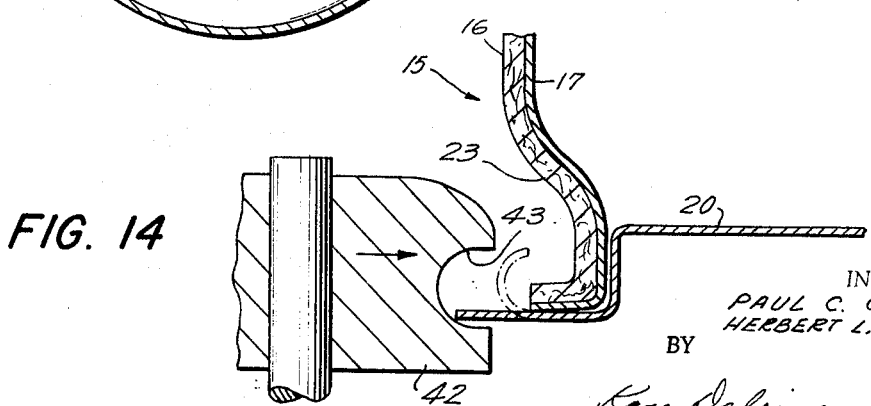

Sept. 13, 1966 P. C. GAYLORD ET AL 3,272,671
METHOD OF MAKING A COMPOSITE FIBER AND METAL
TUBULAR CONTAINER BODY
Filed Aug. 28, 1963 5 Sheets-Sheet 5

INVENTORS
PAUL C. GAYLORD
HERBERT L. CARPENTER, Jr.
BY
Kane, Dalsimer and Kane
ATTORNEYS

United States Patent Office 3,272,671
Patented Sept. 13, 1966

3,272,671
METHOD OF MAKING A COMPOSITE FIBER AND METAL TUBULAR CONTAINER BODY
Paul C. Gaylord, Staten Island, and Herbert L. Carpenter, Jr., Babylon, N.Y., assignors to The Greif Bros. Cooperage Corporation, Delaware, Ohio, a corporation of Delaware
Filed Aug. 28, 1963, Ser. No. 305,111
6 Claims. (Cl. 156—86)

This invention relates to an improved method of making a composite fiber and metal tubular container body.

Composite fiber and metal containers formed with an outer shell of fiber and an inner shell or liner of metal have recognized advantages. Thus, they afford many of the advantages of both fiber and metal containers. The metal liner prevents leakage from inside and contamination from the outside. Selected metals such as stainless steel or aluminum alloys are resistant to the corrosive actions of chemicals. The fiber outer shell affords protection to the metal liner from impacts resulting from dropping or contact with other containers or objects. Containers of this type are less expensive than metal containers of comparable size and strength. In addition, they also have a favorable strength to weight ratio.

The manufacture of containers of this type presents difficulties since the fiber shell should tightly embrace the metal lining to provide, in effect, a unitary self-reinforcing structure. The assembly of the two shells to obtain this desired tight fitting relationship has been a relatively costly, critical and time consuming operation.

It is an object of the present invention to provide an improved method of making composite fiber and metal tubular container bodies wherein an outer fiber shell and an inner metal shell or liner are assembled together in tight fitting relationship in a simple inexpensive and rapid operation.

A further object is the provision of an improved method of making composite fiber and metal containers wherein one end of the container is necked inwardly so that it can be efficiently stacked in superimposed relationship with other containers and with the end portion of reduced diameter nested into the recessed opposite end of an adjacent container.

Our invention contemplates the provision of a first tubular shell made of convolutely wound layers of fiber adhesively laminated together and a second shell whose outside diameter is no greater than and approximates the inside diameter of the first shell and is made of a sheet of metal of sufficient resilience so that the shell may be diametrically compressed and will thereafter return to its original diameter and configuration. The second shell is subjected to compressive forces across two intersecting diameters to reduce all of its outside diameters to a dimension less than the corresponding inside diameters of the first shell. While thus compressed the second shell is telescopically assembled inside the first shell. The compressive forces are then released and the metal shell expands so that the fiber shell tightly embraces the metal shell or liner.

In the accompanying drawings:

FIG. 3 is a partial diagrammatic perspective view showing the fiber and metal shells prior to assembly and illustrating one type of mechanism that may be employed for diametrically compressing the metal shell;

FIG. 4 is a sectional view in the direction of the arrows on the line 4—4 of FIG. 3 showing the metal shell compressed across one diameter;

FIG. 5 is a sectional view in the direction of the arrows on the line 5—5 of FIG. 3 showing apparatus that may be employed for compressing the metal shell across an intersecting diameter;

FIG. 6 is a top plan view showing the metal shell superimposed over the fiber shell and with the metal shell compressed across one transverse axis or diameter;

FIG. 7 is a similar view showing the metal shell compressed across two transverse axes or diameters intersecting each other at right angles and showing how every diameter of the metal shell is smaller than the corresponding diameters of the fiber shell so that it may be telescoped therein;

FIG. 8 is a perspective view showing the metal shell telescoped inside of the fiber shell and in its expanded condition thereby forming a composite container body and also illustrating the apparatus used in compressing the shell in withdrawn or elevated position;

FIG. 11 is a diagrammatic partially sectional view illustrating apparatus which may be employed for reducing the diameter of one end portion of a composite container body;

FIG. 12 is a detail view showing the portion of the composite shell and the dies used in reducing the diameter of the end portion thereof;

FIG. 13 is a sectional view in the direction of the arrows on the line 13—13 of FIG. 11 showing the shell and the dies used for reducing the diameter of the end portion;

FIG. 14 is a detailed partially diagrammatic and sectional view illustrating apparatus which may be utilized for attaching one of the head portions to the composite shell;

Figure 1:
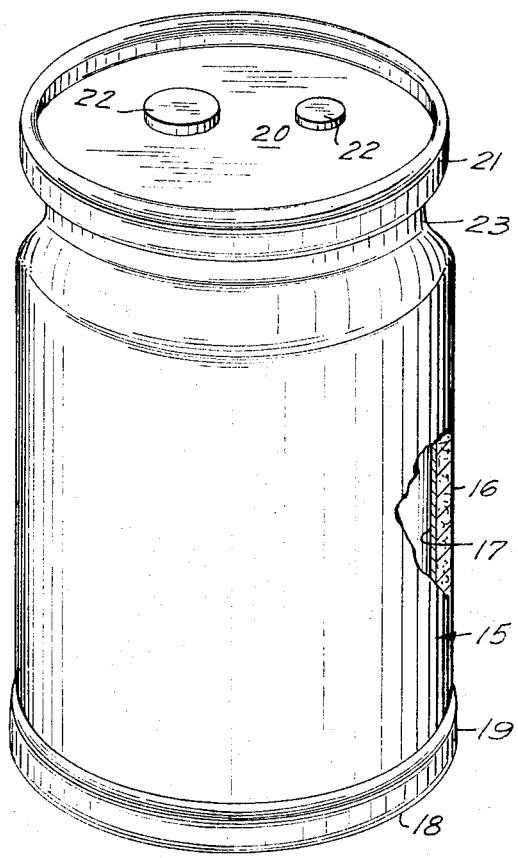
FIG. 1 is a perspective view of one form of composite fiber and metal container made in accordance with our improved method showing a portion of the side wall of the container broken away to reveal the composite construction thereof.
Figure 2:
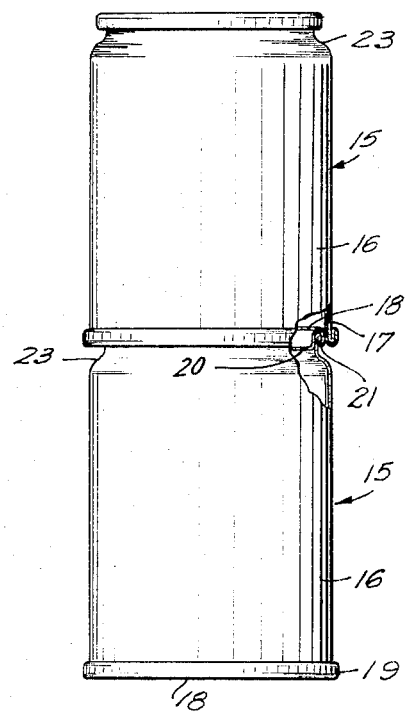
FIG. 2 is a side elevational view of two stacked or superimposed containers of the type made by our improved method and showing the lower corner of the upper container as being broken away to reveal the nested interfitting of the containers.

We have shown a container or drum having a composite fiber and metal tubular body portion 15 in FIG. 1. Two stacked or super-imposed drums of this type are shown in FIG. 2. These drums or containers are illustrative of the types of composite fiber and metal drums which may be made in accordance with our improved method. The composite tubular container body 15 is made of an outer shell 16 of convolutely wound layers of fiber laminated together by a suitable liquid container adhesive such as casein glue or water based resin dispersion adhesive. Fiber shells of this type are well known. They are generally made from elongated sheets of kraft or other fibreboard coated on one surface with the adhesive and convolutely wound around a mandrel. After the desired number of plies have been wound around a mandrel the sheet of kraft or other fiber is severed from the supply, the mandrel is contracted and the shell is removed therefrom.

The tubular container body has an inner shell or lining 17 of sheet metal and the two shells are in direct and immediate engagement with each other with the fiber shell tightly embracing the metal shell. The two shells may be suitably bonded together for their entire contacting surface or for only a portion thereof. If preferred, they may be free of any adhesive bonding to each other and may depend solely upon tight frictional engagement. Where a bonding agent is employed any suitable adhesive may be used which has bonding affinity for both the metal and fiber of the shells such as an epoxy resin. A suitable head such as a metallic head 18 is secured by a beaded sealing engagement 19 to the lower end of the tubular composite container body. Similarly, a suitable head such as the metal head 20 may be secured to the upper end of the container as by tight sealing beading 21. Threaded fittings or covers 22 may be applied to the head 20 for inserting and removing materials and for providing access to the interior of the container. The heads may also be of composite fiber and metal construction with the fiber disposed on the outside so as to resist puncture.

The container is preferably necked inwardly adjacent one end thereof so as to provide an end portion of reduced diameter. In the embodiments illustrated in FIGS. 1 and 2, the upper ends of the container are necked inwardly as indicated at 23. Thus, the upper end portion, together with the upper head 20 and beaded connection 21 are of reduced diameter. The head at the lower end of the container is recessed inwardly. The relative sizes of the recess at the lower end of the container and of the reduced upper end of the body portion and of bead 21 are such that the upper end of the container may have nested engagement with the lower end of a similar container superimposed thereon, as shown in FIG. 2. This provides for efficient stacking of the containers. Instead of being necked inwardly at its upper end as shown in FIGS. 1 and 2 and in detail in FIG. 9, the container may be necked inwardly adjacent its lower end as shown in detail at 23' in FIG. 10.

Figure 9:
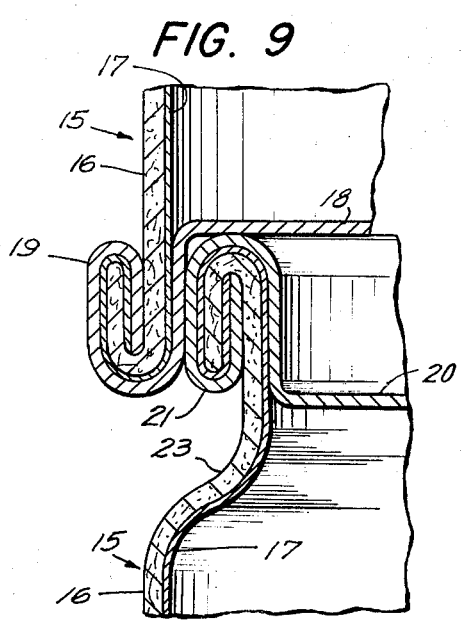
FIG. 9 is a detail sectional view showing the upper corner portion of one composite container and the lower corner portion of another composite container in which the upper end of the lower shell is of reduced diameter so that it nests in a recess in the lower end of the superimposed shell.
Figure 10:
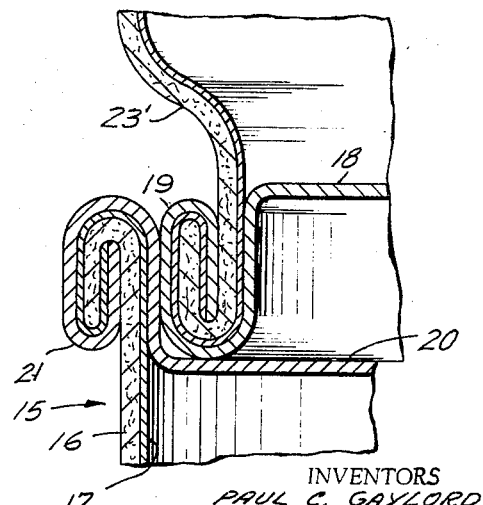
FIG. 10 is a similar detail sectional view but illustrating modified containers in which the lower end is of reduced diameter so that it nests in a recess at the upper end of the container on which it rests.
Figure 15:
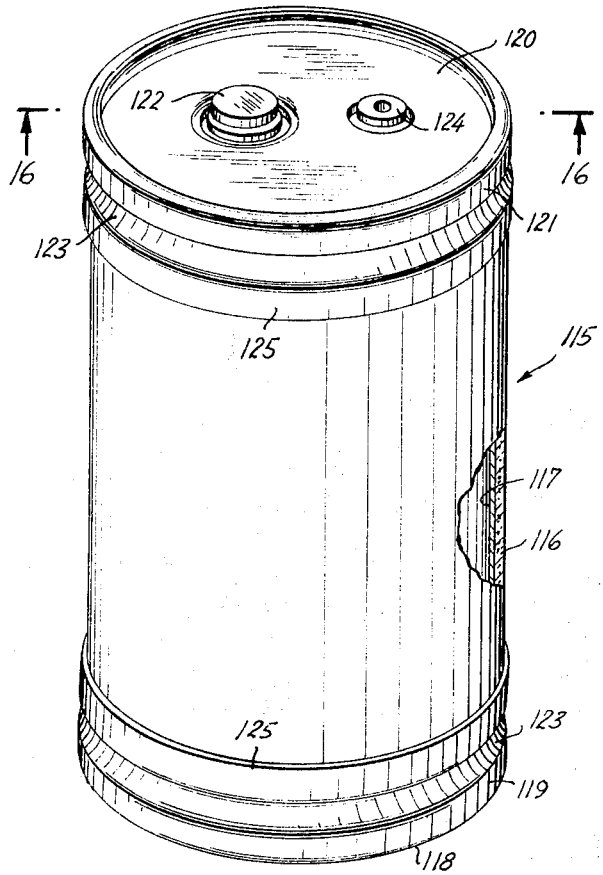
FIG. 15 is a perspective view similar to FIG. 1 of another form of composite fiber and metal container made in accordance with our method showing a portion of the side wall of the container broken away.
Figure 16:
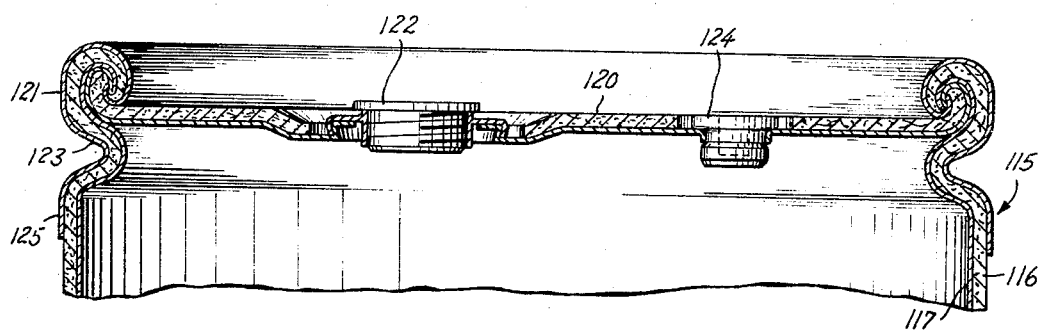
FIG. 16 is a detailed sectional view through the head of the container shown in FIG. 15 in the direction of the arrows on the line 16—16 of FIG. 15.
Figure 17:
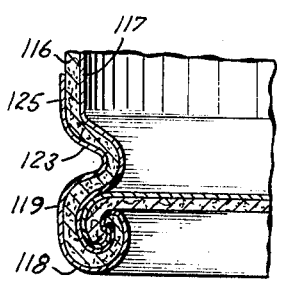
FIG. 17 is a detailed sectional view showing a portion of the bottom of the container and its attachment to the shell or side wall.

FIG. 9 simply shows in detail the construction of the upper and lower portions of containers in stacked relationship when the upper end is necked inwardly. FIG. 10 similarly shows the construction and relationship of stacked containers when the lower end is necked inwardly. The containers shown in FIGS. 1, 2, 9 and 10 are simply illustrative of containers having composite fiber and metal tubular bodies made in accordance with our improved method. It should be understood that composite containers having different configurations and different arrangements of heads such as removable heads may also be made in accordance with our improved method, as for instance, as shown in FIGS. 15 to 17.

Our improved method of assembling the fiber and metal shells together is illustrated in FIGS. 3 to 8, inclusive. In this connection, we provide a tubular shell 16 which as previously indicated is made of convolutely wound layers of kraft board or other fiber laminated together preferably by a liquid containing adhesive such as casein or a water bound resin dispersion adhesive. The number of laminations used in making the fiber shell may vary. Generally speaking, we have found that satisfactory results are obtained if between 4 and 10 laminations are employed.

We also provide a tubular shell 17 made of sheet metal stock having sufficient resilience so that when the shell is compressed, transversely or diametrically, it will upon release assume its original diameter and configuration. For this purpose, we may use sheet steel, sheet stainless steel, sheet aluminum alloy, bronze, brass, or the like. Where the container is used for holding corrosive chemicals, stainless steel or similar corrosive resisting materials may be employed. The gauge of the metal employed may vary with the intended use and purpose. Under any circumstances, the gauge may be substantially lighter than that employed in all metal containers or drums. As an example, in conventional steel drums for full liquid use of 16 gallons capacity, 20 gauge steel is generally required. We have found that we may employ an inner tubular shell or lining of 29 gauge or less.

The outside diameter of the metal shell should be no greater than and should approximate the inside diameter of the fiber shell. It will be appreciated that in closely fitting diameters of this type telescopic assembly of the shells presents a problem. If the shell is in freshly made, wet condition prior to setting of the adhesive, it is in slightly expanded form and will shrink on setting. Under those circumstances, the metal shell may be slid into the wet fiber shell in closely fitting relationship and thereafter, upon setting of the adhesive and drying of the fiber shell, it will shrink to tightly embrace the metal shell. However, even under these circumstances, the fit must be rather close and time and care is required to assemble the parts and to permit the outer shell to set.

We have found that we can facilitate and expedite the assembly of the two shells by subjecting the inner metal shell to compressive forces in two intersecting transverse axes or diameters, preferably disposed at right angles to each other. Thus, as shown in FIG. 6, the metal shell 17 may be first compressed across one transverse or diametric axis with the result that the diameters of the metal shell adjacent one transverse axis are less than the inside diameters of the corresponding portion of the fiber shell. Unfortunately, however, this increases the dimension of the diameter of the metal shell along the transverse axis or diameter disposed at right angles to the first transverse axis with the result that the diameer of the metal shell is larger than the inside diameter of the fiber shell along this second axis also as shown in FIG. 6. To meet this situation, a compressive force is also applied across the shell along a second axis disposed at right angles to the first axis so that the outer surface of the metal shell, at least at one end of the second axis, is transversely concave, as shown in FIG. 7, thereby reducing all transverse dimensions or diameters of the metal shell with respect to the corresponding diameters of the fiber shell. Thus, as shown at FIG. 7, the metal shell may be readily telescoped inside of the fiber shell.

The compressing of the metal shell along transverse axes intersecting each other at right angles may be accomplished manually by simply pressing the opposite sides of the metal shell inwardly. It may also be accomplished mechanically by means of simple apparatus, such as that shown in FIGS. 3 to 8.

Thus, we have shown a fixture in the form of a plate 25 formed with two spaced clips or brackets 26 and 27 supported on the undersurface of the fixture 25 so as to engage and apply compressive force to diametrically opposite sides of the metal shell. The clip 26 may be permanently secured in place, and the clip 27 may be adjustably held by screws extending through selected apertures 28. By selecting the proper adjusted position for the clip 27, the desired degree of compression of the metal shell 17 across the first transverse axis may be obtained. Similarly, the clip 27 may be adjusted to accommodate shells of different sizes. When the clip 27 has been adjusted to the proper position, the metal shell 17 is inserted in the clips 26 and 27 so as to be diametrically compressed across a first transverse axis or diameter, as indicated in FIGS. 3, 4 and 6. The fixture plate 25 also has a slot 29 extending inwardly from one edge thereof between clips 26 and 27. The rod or bar 30 may be shifted inwardly into engagement with the outer surface of the metal shell at a point intermediate the two clips 26 and 27, so as to exert compressive force against the metal shell along a transverse axis or diameter disposed at right angles to the first transverse axis extending between clips 26 and 27. As the compression bar 30 shifts inwardly, it is guided by the supporting rod 31 extending upwardly through slot 29 and serving to support the bar 30 for shift movement. When compression bar 30 is shifted inwardly, as shown in dotted lines in FIG. 5 and full lines in FIG. 7, the outside surface of the metal shell at one end of the second transverse axis and adjacent the point of engagement by the compression bar, is shifted inwardly so as to assume a transversely concave configuration. This is most clearly shown in FIG. 7. In this condition, it will be seen that every transverse dimension or diameter of the metal shell is less than the corresponding transverse dimension or diameter of the fiber shell with the result that the metal shell can be readily telescoped inside the fiber shell by shifting one with respect to the other.

During the telescoping operation, the compressive forces applied across the two transverse axes of the metal shell should be continued. After the two shells have been telescoped together, the fixture 25 and compression bar 30 are shifted out of engagement with the metal shell so as to release the compressive forces. The fixture plate 25 and supporting rod 32 may be connected to a suitable hydraulic ram (not shown) for shifting and operating the device.

The composite tubular container body formed by the method described above is of cylindrical shape and is shown in the lower portion of FIG. 8. A suitable metal and fiber head may be secured to the lower end of the shell by a sealing bead. A similar head may also be secured to the upper end, or if preferred, the upper end may be beaded and grooved and provided with a removable head. We prefer, however, to neck one end (either the lower or upper end) of the shell inwardly and to then secure the heads to the two ends of the shell. This may be accomplished by the apparatus shown in FIGS. 11 through 13. Thus, the apparatus is provided with a fixed base or standard 35, having horizontal rails 36 secured thereto for supporting the movable standard 37, which is spaced therefrom. Supported from the fixed standard 35, so as to rotate in opposite direction and in closely spaced relationship to each other, are the complementary rotary dies 38 and 39. These dies have tapered offset portions arranged as shown so that when the end portion of the composite tubular container body 15 is interposed therebetween, it will be drawn diametrically inwardly and longitudinally outwardly. Another pair of complementary rotary dies 40 and 41 are supported in closely spaced relationship by the movable standard 37 so as to engage the opposite end of the composite container body 15 and flare it outwardly. Dies 41 and 39 may be lifted upwardly to permit the insertion of a composite container body therebetween. They are then lowered into engagement with the end portions of the container body and the dies are rotated so as to draw the one end of the shell inwardly and to flare the other end of the shell outwardly as shown.

Suitable drive mechanism is provided for the apparatus such as motor and gearing (not shown).

After the one end of the drum has been flared outwardly and the other end of the drum has been reduced in diameter and provided with a flange projecting outwardly therefrom, as shown in FIGS. 11 to 14, metal heads may be secured to the ends by a beaded connection of the type shown. This may be accomplished by placing a metal head over the end of the shell, as shown in FIG. 14, so that a marginal apron or flange projects outwardly beyond the edges of the shell. The edges of the head and of the laminated shell body are then rolled or beaded inwardly by means of a suitable rotatable beading die 42, also shown in FIG. 14. The rotatable beading die has a peripheral groove 43 which is engaged against the projecting edges of the head and shell so as to bead or roll them inwardly into a tight bead. The head at the opposite end of the shell may be connected in a similar fashion by means of a tightly beaded connection.

The drawing of the shell into a reduced diameter and the beading of the end portion should be carried out while the fiber shell is still in wet, freshly made condition prior to setting of the adhesive or alternatively, the portions of the shell which are thus drawn or beaded should be moistened with water. This minimizes or prevents fracturing or cracking of the fiber material.

Instead of permanently applying a head to both ends of the container, one or both of the closures or heads may be removably applied thereto in any well known manner. The heads may be made of metal, as shown, or may be made of composite fiber and metal and may be provided with a separate liner of kraft board or of plastic material. It also should be understood that the reduced portion of the container may be disposed at the upper end thereof, as shown in FIGS. 1, 2 and 9, or may be disposed at the lower end of the drum, as shown in FIG. 10.

In the form of our invention heretofore described, one end of the composite shell is necked inwardly so as to facilitate stacking of the shells. It should be understood that the containers made in accordance with our invention may also be of uniform diameter from top to bottom, or may be of substantially uniform diameter having an external groove and internal rib adjacent each end, as shown in FIGS. 15 to 17.

Thus, we have shown a composite container body 115 to which the upper and lower heads 118 and 120 are secured. The composite container body is made of an outer shell 116 and laminated layers of convolutely wound fiber and an internal shell 117 made of a suitable metal. The two shells are made as described, in accordance with the container shown in FIG. 1, and the inner and outer shells are assembled together in the same manner by compressing the inner metal shell across two intersecting diameters to reduce all of the dimensions thereof to less than the internal dimensions of the fiber shell. The two shells are then telescoped together and the metal shell is released so as to form tight engagement with the fiber shell. Also, as previously explained, an adhesive or bonding agent may be applied between the two shells.

When the composite container body has been assembled from the two shells, we then secure the metal chimes 125 around the upper and lower exterior surfaces of the shell. The external grooves 123 are then rolled or formed into the chime portions at the upper and lower edges of the container body, and the upper and lower heads are secured to the ends by a beaded connection, of the type shown. This may be accomplished in the same manner as described in the first embodiment of our invention, and as illustrated in FIG. 14. In other words, the heads are placed over the ends of the shell so that a marginal flange or apron projects beyond the edges of the shell. The edges of the head and the laminated shell body are then rolled or beaded inwardly by means of a suitable rotatable beading dye 42, as shown in FIG. 14.

The forming of the grooves 123 and the beading of the end portions of the shell to attach the closures should be carried out while the fiber shell is still in wet, freshly made condition, prior to setting of the adhesive. Alternatively, the portions of the shell which are thus formed and beaded should be moistened with water.

The upper and lower heads may be made of metal, as shown in the first form of our invention, or may be made of composite laminated layers of fiber and metal, as shown in FIGS. 15 to 17. Where made of composite fibers and metals, the fiber is preferably positioned on the exterior of the metal on the interior. In this connection, the metal is preferably of the same type used in forming the inner shell 117. Where the metal is stainless steel or copper-nickel alloy or aluminum, it will resist corrosion. Other metals provided with suitable protective coating or plating may be employed. The fiber outer layer on the two heads serves to give additional rigidity and also to resist puncture. The upper shell may be formed with suitable fittings for filling and pouring, such as the removable covers 122 and 124.

Instead of permanently applying the closures or heads, one or both of them may be removably applied to the container.

It will thus be seen that we have provided an improved method of making composite fiber and metal tubular container bodies wherein an outer fiber shell and an inner metal liner are assembled together in tight fitting relationship in a simple, inexpensive and rapid operation. It will also be seen that we have provided an improved method of making such composite container bodies in which one end is necked inwardly so that it can be efficiently stacked in nested relationship with other containers.

Modifications may be made in the illustrated and described embodiment of the invention without departing from the invention as set forth in the accompanying claims.

We claim:

1. The method of making a composite fiber and metal tubular container body which comprises: providing a first tubular shell made of wound layers of fiber adhesively laminated together; providing a second tubular shell with an outside diameter no greater than and approximating the inside diameter of the first shell and made of sheet metal of sufficient resilience so that the shell may be diametrically compressed and will thereafter resume is normal shape; applying compressive force to the second shell across intersecting transverse axes so that all outside diameters of the second shell are reduced to a dimension less than the corresponding inside diameters of the first shell; then while maintaining the second shell in such transversely compressed condition, telescopically assembling the two shells with the second shell being disposed inside the first shell; and thereafter releasing the compressive forces applied across the second shell so that it expands into engagement with the inside surface of the first shell to thereby provide a composite fiber and metal container body.

2. The method of making a composite fiber and metal tubular container body which comprises; providing a first tubular shell made of wound layers of fiber adhesively laminated together; providing a second tubular shell with an outside diameter no greater than and approximating the inside diameter of the first shell and made of sheet metal of sufficient resilience so that the shell may be diametrically compressed and will thereafter resume its normal shape and diameter; applying a compressive force against a first transverse axis of the second shell while also compressing the second shell across a second transverse axis subtantially at right angles to the first transverse axis so that the outside surface of the shell at least at one end of said second transverse axis is transversely concave to thereby reduce all outside diameters of the second shell to less than the corresponding inside diameters of the first shell; then while maintaining the second shell in such transversely compressed condition, telescopically assembling the two shells with the second shell being disposed inside the first shell; and thereafter releasing the compressive forces applied across the second shell so that it expands into engagement with the inside surface of the first shell to thereby provide a composite fiber and metal container body.

3. The method of making a composite fiber and metal tubular container body, as set forth in claim 2, in which an adhesive having an affinity for both the fiber and metal of the first and second shells is applied between the shells to strengthen the assembly.

4. The method of making a composite fiber and metal tubular container body, as set forth in claim 2, in which the adhesive laminating the fiber layers together in the first shell contains a liquid vehicle and the first shell is in freshly made wet condition prior to the setting of the adhesive at the time the second shell is telescopically assembled with the first shell so that upon setting of the adhesive and drying of the first shell it shrinks into tight compressive relationship with the second shell.

5. The method of making a composite fiber and metal tubular container body which comprises: providing a first tubular shell made of convolutely wound layers of fiber adhesively laminated together; providing a second tubular shell with an outside diameter no greater than and approximating the inside diameter of the first shell and made of sheet metal of sufficient resilience so that the shell may be diametrically compressed and will thereafter resume its normal shape and diameter; applying a compressive force across a first transverse axis of the second shell while also compressing the second shell across a second transverse axis substantially at right angles to the first transverse axis so that the outside surface of the shell at least at one end of said second transverse axis is transversely concave to thereby reduce all outside diameters of the second shell to less than the corresponding inside diameters of the first shell; then while maintaining the second shell in such transversely compressed condition, telescopically assembling the two shells with the second shell being disposed inside the first shell; thereafter releasing the compressive forces applied across the second shell so that it expands into engagement with the inside surface of the first shell to thereby provide a composite fiber and metal container body; and then while at least one end portion of the fiber shell is wet applying a compressive force to opposite surfaces of said one end portion of the composite container body and drawing it diametrically inwardly and longitudinally outwardly so as to produce an end portion of the container body of reduced diameter.

6. The method of making a composite fiber and metal tubular container body which comprises: providing a freshly made first shell of convolutely wound layers of fiber laminated together with a liquid containing adhesive with the shell in wet condition prior to the setting of the adhesive; providing a second tubular shell with an outside diameter no greater than and approximating the inside diameter of the first shell and made of a sheet metal of sufficient resilience so that the shell may be diametrically compressed and will thereafter resume its normal shape and diameter; applying a compressive force across a first transverse axis of the second shell while also compressing the second shell across a second transverse axis substantially at right angle to the first transverse axis so that the outside surface of the shell at least at one end of said second transverse axis is transversely concave to thereby reduce all outside diameters of the second shell to a dimension less than the corresponding inside diameters of the first shell; then while maintaining the second shell in such transversely compressed condition, telescopically assembling the two shells with the second shell being disposed inside the first shell; thereafter releasing the compressive forces applied across the second shell so that it expands into engagement with the inside surface of the first shell to thereby provide a compoiste fiber and metal container body; then while the fiber shell is still wet prior to the setting of the adhesive, applying a compressive force to opposite surfaces of the one end of the composite container body and drawing it diametrically inwardly and longitudinally outwardly so as to produce an end portion of the container of reduced diameter and then drying the fiber shell to cause the adhesive to set and the fiber to shrink into tight compressive engagement with the metal shell.

(References on following page)

References Cited by the Examiner

UNITED STATES PATENTS

| | | | |
|---|---|---|---|
| 2,411,542 | 11/1946 | Ilch | 156—294 X |
| 2,483,230 | 9/1949 | Parsons et al. | 156—293 |
| 2,517,889 | 8/1950 | Kuffler | 156—126 |
| 2,695,255 | 11/1954 | Avery | 156—165 |
| 2,804,322 | 8/1957 | Herzog | 156—293 |
| 2,944,714 | 7/1960 | Muhlhoff | 229—5.5 |
| 2,984,870 | 5/1961 | Warnken | 156—165 |
| 3,116,001 | 12/1963 | Carpenter et al. | 229—5.5 |

EARL M. BERGERT, *Primary Examiner.*

FRANKIN T. GARRETT, H. ANSHER, J. F. McNULTY, *Assistant Examiners.*